United States Patent [19]

Ames

[11] Patent Number: 5,291,194
[45] Date of Patent: Mar. 1, 1994

[54] APPARATUS FOR INTERCONNECTING AN UNDERWATER VEHICLE AND A FREE-FLOATING POD

[75] Inventor: Gregory H. Ames, Gales Ferry, Conn.

[73] Assignee: The United States of America as represented by the Secretary of the Navy, Washington, D.C.

[21] Appl. No.: 45,156

[22] Filed: Apr. 12, 1993

[51] Int. Cl.⁵ .............................................. H04B 13/02
[52] U.S. Cl. ................................... 340/850; 114/20.1; 114/328; 114/312; 441/1; 441/11; 441/136
[58] Field of Search ....................... 340/850, 851, 852; 114/328, 20.1, 312, 313, 270; 441/1, 7, 11, 21, 136

[56] References Cited

U.S. PATENT DOCUMENTS

| | | | |
|---|---|---|---|
| 3,987,741 | 10/1976 | Tryon | 114/16 R |
| 4,010,619 | 3/1977 | Hightower et al. | 114/16 R |
| 4,516,227 | 5/1985 | Wener et al. | 367/15 |
| 4,557,697 | 12/1985 | Kontar et al. | 441/2 |
| 4,799,825 | 1/1989 | Meyerhoff et al. | 114/230 |
| 5,050,136 | 9/1991 | Nadolink | 367/134 |
| 5,235,932 | 8/1993 | Reich | 114/322 |

Primary Examiner—J. Woodrow Eldred
Attorney, Agent, or Firm—Michael J. McGowan; Prithvi C. Lall; Michael F. Oglo

[57] ABSTRACT

Apparatus is provided for interconnecting an unmanned underwater vehicle (UUV) and a free-floating pod, the apparatus comprising a communications cable extending between the pod and a less buoyant buoy, the buoy being in communication with a distal station, a mobile UUV in communication with a control vessel, connector structure on the UUV adapted to intercept the cable and adapted to slide along the cable toward the pod, and complementary engagement structure on the UUV and the pod adapted to cause the UUV to engage the pod in a preselected orientation and azimuth, to place the control vessel in communication with the distal station.

18 Claims, 3 Drawing Sheets

APPARATUS FOR INTERCONNECTING AN UNDERWATER VEHICLE AND A FREE-FLOATING POD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to apparatus for interconnecting of two submerged bodies and is directed more particularly to such apparatus as will automatically align the two bodies upon interconnection to facilitate establishment of communication between the two bodies.

(2) Description of the Prior Art

The underwater connection of two bodies may be required to establish communication between the two bodies in situations in which covertness and/or high data rate transmission is required. Such connections are required, for example, between submarines and underwater vehicles, such as torpedoes.

In an illustrative system, an unmanned undersea vehicle (UUV) is provided with a communication line extending to a control vessel, typically a submarine. A controlled body, typically a weapon, such as a torpedo, is deployed in a water column and has extending therefrom a communication line connected at a remote end to a submerged free-floating buoy. The buoy is connected by a communication cable to a free-floating pod of greater buoyancy than the buoy. Thus, the pod floats above the buoy with the communication cable disposed generally vertically therebetween. In operation, the UUV is maneuvered into contact with the vertical cable between the buoy and the pod, connects to the cable, and rides along the cable to a point adjacent to, or engaging, the pod. Communication is established between the UUV and the pod which effects communication between the submarine and the torpedo. Accordingly, from a relatively safe distance the submarine may send instructions to the torpedo.

While in some communication systems, it is acceptable for the UUV merely to be proximate the pod, in fiber-optic and free space laser communications, particularly where multiple spatially separated channels are involved, engagement and highly accurate alignment of the UUV and the pod are required. In such instances, only a single orientation of the UUV relative to the pod is acceptable.

More particularly, the single orientation includes orientation along an axis of substantially translational motion of the UUV relative to the pod; and an angular position of the UUV relative to a reference angular position of the pod (i.e., azimuthal position of the UUV). Positioning underwater bodies for their interconnection with azimuthal accuracy has heretofore required extensive human interaction and has been difficult, at best, in view of local currents and sea conditions.

There is, therefore, a need for a UUV adapted to engage a generally vertical communication cable extending in a water column between a lower free-floating buoy and an upper free-floating pod and adapted to ride along the cable into interlocking engagement with the pod in a selected orientation and azimuth for interconnection of communication components requiring precise alignment.

SUMMARY OF THE INVENTION

It is accordingly an object of the invention to provide apparatus for interconnecting underwater bodies, such as a UUV and a communications pod, the apparatus including a UUV adapted to automatically engage a generally vertical cable suspended in a water column.

A further object of the invention is to provide such apparatus in which the UUV is adapted, after engagement with the cable, to ride along the cable into engagement with the pod.

A still further object of the invention is to provide such apparatus in which the UUV and the pod are adapted to automatically engage each other in a manner facilitating correct alignment of the two bodies so as to provide precise alignment of communication components.

With the above and other objects in view, as will hereinafter appear, a feature of the present invention is the provision of apparatus for interconnecting an unmanned underwater vehicle and a free-floating communication pod, the apparatus comprising a communication cable depending from the pod and extending to a buoy of less buoyancy than the pod, such that the cable extends generally vertically in a column of water between the pod and the buoy, the buoy being in communication with a distal station, a mobile unmanned underwater vehicle having therein guidance means for directing the vehicle to the cable, the vehicle being in communication with a control vessel, connector means mounted on the vehicle and adapted to intercept the cable, the connector means being further adapted to permit the cable to slide therethrough as the vehicle continues movement after the intercept of the cable, and complementary alignment means on the vehicle and the pod adapted to cause the vehicle to engage the pod in a preselected orientation and azimuth, whereby to place the control vessel in communication with the distal station.

The above and other features of the invention, including various novel details of construction and combination of parts, will now be more particularly described with reference to the accompanying drawings and pointed out in the claims. It will be understood that the particular apparatus embodying the invention is shown by way of illustration only and not as a limitation of the invention. The principles and feature of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent wherein.

DESCRIPTION OF THE PREFERRED EMBODIMENT

Figures 1, 2:
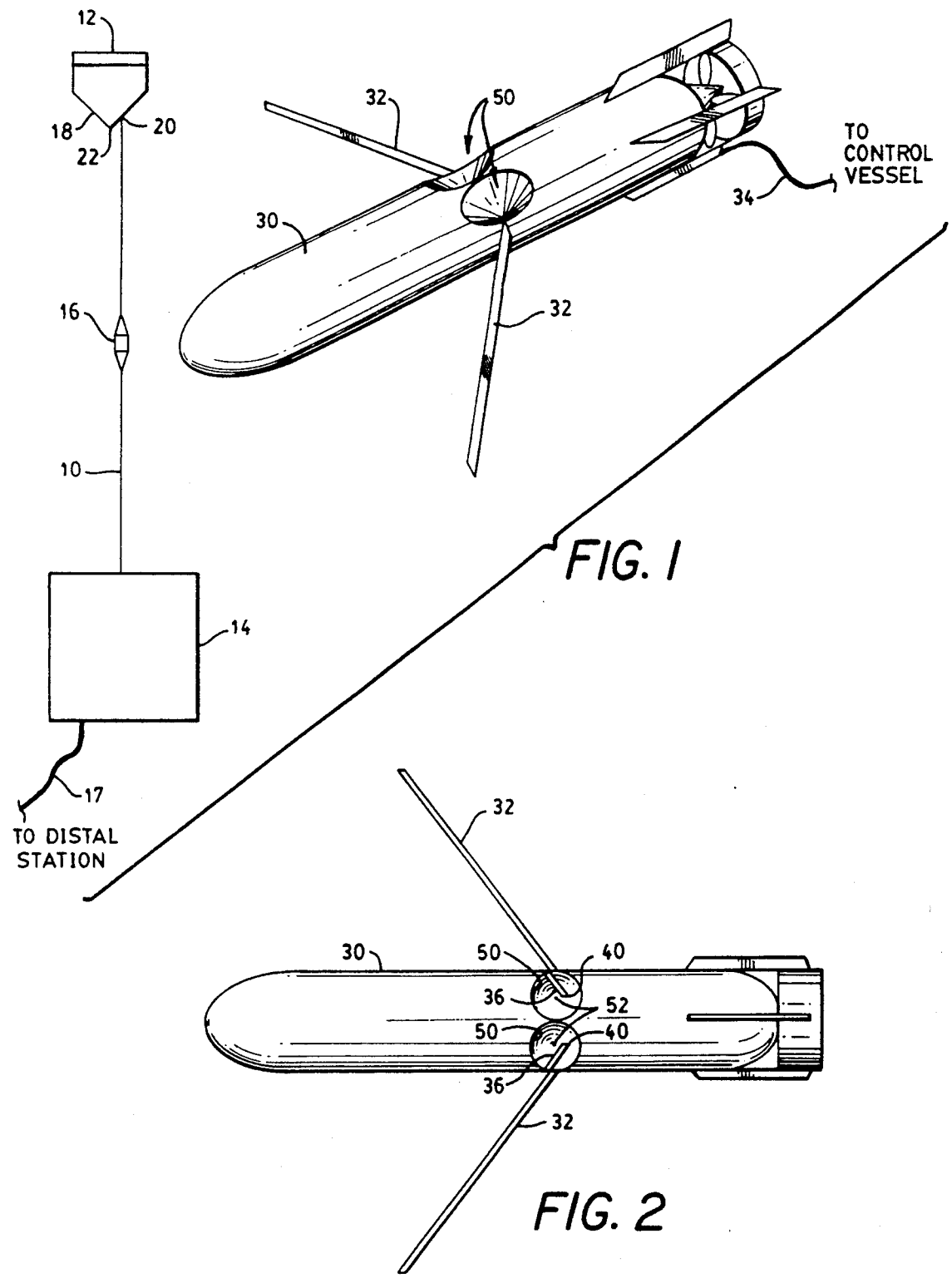
FIG. 1 is a partially perspective, partially diagrammatic view, of apparatus illustrative of an embodiment of the invention.
FIG. 2 is a top plan view of a mobile underwater vehicle component of the apparatus.
Figure 3:
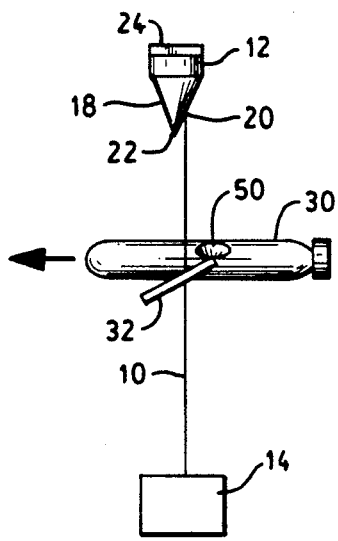
FIGS. 3-5 are side elevational diagrammatic views illustrating a sequence of events in the interconnection of the vehicle and pod.

Referring to FIG. 1, it will be seen that an illustrative apparatus includes a communication cable 10, which may, for example, be a fiber-optic cable. Cable 10 is connected at a first end thereof to a free-floating communication pod 12 and at a second end thereof to a buoy 14 of less buoyancy than the pod. The buoy is in communication, as by a line 17, with a distal station, typically a weapon, such as a torpedo (not shown). Pod 12, being more buoyant than buoy 14, floats above the buoy, causing the cable 10 to be generally vertical in attitude. The buoy 14 is typically also free-floating, but in shallow water applications may be bottom-stationed. In the cable 10, there is disposed an acoustic beacon 16 adapted to signal omnidirectionally.

Pod 12 includes a hull portion 18 which is conically shaped. Cable 10 is fixed to hull portion 18 of pod 12 at a connection point 20 close to, but spaced from, a central point 22 at the cone-shaped hull portion 18. The pod 12 is provided with a stationary rudder 24 fixed to the upper surface of the pod.

The system includes a mobile unmanned underwater vehicle (UUV) 30. The UUV 30 is provided with apparatus (not shown) adapted to detect and "home" on the signal of acoustic beacon 16, in both azimuth and depth. Homing devices of this general type are known and have been used extensively in mobile underwater vehicles, such as homing torpedoes.

The UUV 30 is provided with extendable arms 32 which project from sides of the UUV and are angled forwardly. The UUV is further provided with propulsion means (not shown) adapted to move the vehicle through the water. The UUV is in communication, as by a line 34, with a control vessel (not shown), such as a submarine.

Figure 8:
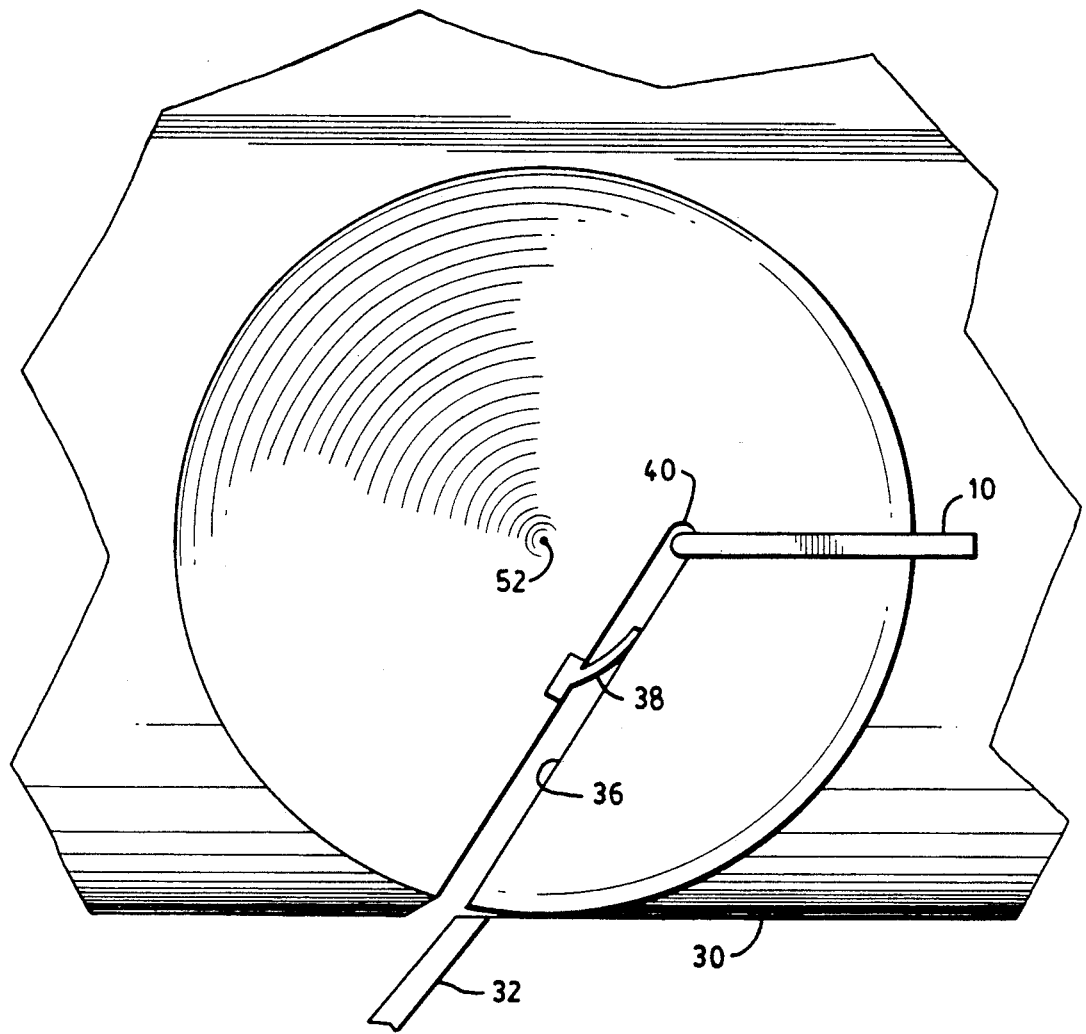
FIG. 8 is a top plan view of alignment means disposed in the vehicle.

Upon passage of the UUV in close proximity to cable 10, the cable is engaged by one of the arms 32 and is guided by arm 32 into one of the two slots 36. Each of the slots 36 is associated with one of the arms 32. Referring to FIG. 8, it will be seen that an arm 32 of UUV 30 is arranged and disposed so as to guide intercepted cable 10 into slot 36. Slot 36 preferably is provided with a one-way locking mechanism, which may be in the form of a simple leaf spring 38 which permits passage of cable 10 through the slot 36 to a closed end 40 thereof, but prohibits movement of the cable back out of the slot.

Figure 6:
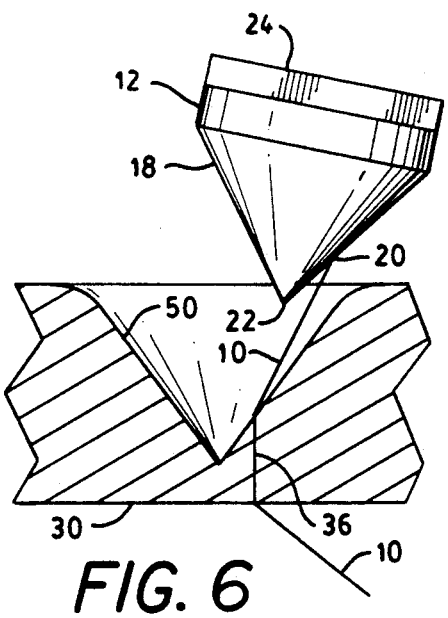
FIGS. 6 and 7 are enlarged diagrammatical illustrations of further sequential events in the interconnection of the vehicle and pod, FIG. 7 showing the pod seated in the vehicle.
Figure 7:
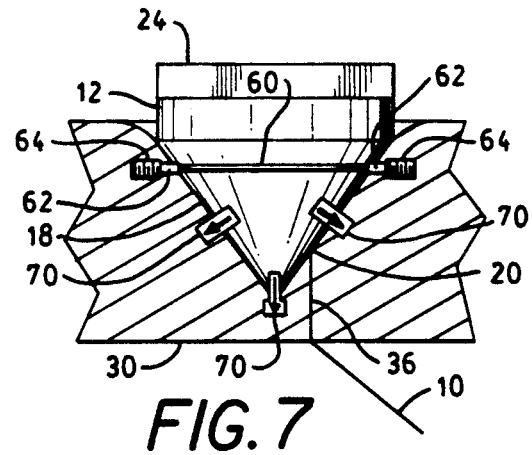

The UUV is provided with two or more conical recesses 50 having central points 52, shown in FIGS. 2 and 6. As shown in FIGS. 6–8, the slots 36 are disposed, respectively, in the recesses 50 and extend through the UUV. The closed end 40 of each slot 36 is spaced from central point 52 of the associated recess 50. The space between central point 52 and slot end 40 of each recess 50 is equal to the space between connector point 20 and central point 22 of the pod. The slot closed ends 40 are, respectively, just aft of their associated recess central points 52.

Figure 4:
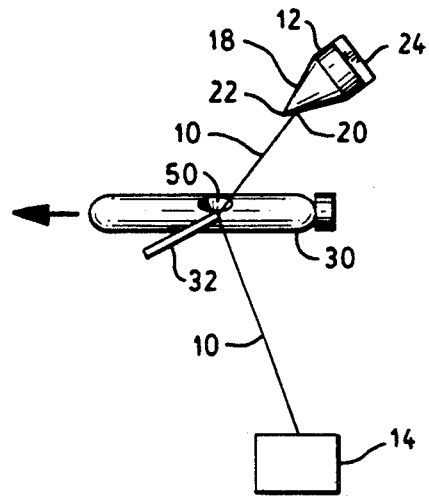
Figure 5:
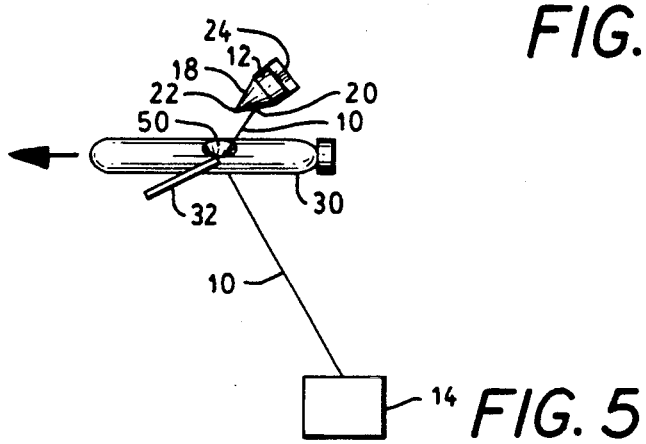

After engagement of the cable by the UUV and movement of the cable along arm 32 into slot 36, passed leaf spring 38, the UUV continues moving forward (FIGS. 4 and 5), causing the cable to slip through the slot as the pod 12 is drawn toward the UUV. As shown in FIG. 6, the conical hull portion 18 of the pod 12 is pulled toward one of the complementary recesses 50 (FIG. 6) and the UUV recess and pod conical portions gradually are directed into alignment.

The off-axis position of the pod connection point 20 and slot closed end 40 eliminates any rotary degree of freedom in the mating of the pod and UUV. The rudder 24 of pod 12 guides the pod through the water (FIGS. 4–6) in approximate alignment with the connection point 20 and central point 22, such that the pod arrives at the recess 50 in position to be readily received in the recess.

Referring to FIG. 7, when pod 12 is fully seated in recess 50, a locking means secures the pod in place. The locking means comprises a groove 60 in a peripheral portion of the pod hull portion 18, and a plurality of spring loaded detents 62 disposed in bores 64 in the wall of each of the conical recesses 50. Upon seating of pod 12 in recess 50, detents 62 snap into groove 60 to lock the pod in the recess 50. Connections 70, shown in FIG. 7 for illustrative purposes, are then in alignment and in abutting engagement. The connections may be for optical, electrical, acoustic, or other communications modes, or a combination thereof.

In operation, the distal station, typically a weapon, the buoy and pod components are launched by a control vehicle, typically a submarine. The pod assumes a position above the buoy with the cable 10 extending therebetween. The submarine then maneuvers to a relatively safe location and launches the UUV. As described above, the self-propelled UUV homes in on the cable, tracking along signals emitted from the beacon in the cable, and intercepts the cable. Continued movement of the UUV causes the UUV to ride up on the cable, relatively, until the UUV lockingly connects with the pod in an orientation and azimuth dictated by the complementary configurations of the interlocking components. Once fitted together, the pod and UUV automatically lock together to establish a communication path including the control vessel, the UUV, the pod, the cable, the buoy and the distal station.

It is to be understood that the present invention is by no means limited to the particular construction herein disclosed and/or shown in the drawings, but also comprises any modifications or equivalents within the scope of the claims. For example, though the UUV has been illustrated and described as having conical recesses therein adapted to receive a conical portion of a pod, it will be apparent that it is the complementary configurations that are critical and that the recess could well be in the pod and the conical protrusion of the UUV, with the UUV conical protrusion being drawn into the pod conical recess. Further, while the above description is directed in large measure to establishing a communication path between a submarine and a weapon, the control vessel may well be a surface ship, helicopter, or lighter-than-air craft, and the distal station may well be another ship, or the like. Communications links, as above described, are useful in establishing paths of communication under certain circumstances between surface ships, between surface ships and submarines and between submarines and various sensor systems.

What is claimed is:

1. Apparatus for interconnecting an unmanned underwater vehicle and a free-floating communications pod, said apparatus comprising:

a communications cable depending from said pod and extending to a buoy of less buoyancy than said pod, such that said cable carries communication signals between said pod and said buoy and extends generally vertically in a column of water between said pod and said buoy, said buoy being in communication with a distal station;

a mobile unmanned underwater vehicle having therein guidance means for directing said vehicle to said cable, said vehicle being in communication with a control vessel;

connector means mounted on said vehicle and adapted to intercept said cable, said connector means being further adapted to permit said cable to slide therethrough as said vehicle continues movement after said intercept of said cable;

complementary alignment means on said vehicle and said pod in a preselected orientation and azimuth; and whereby said control vessel is placed in communication with said distal station.

2. The apparatus in accordance with claim 1 further comprising a beacon disposed in said cable adapted to emit a signal for guiding said vehicle to said cable.

3. The apparatus in accordance with claim 2 wherein said connector means comprises arm means extending from said vehicle.

4. The apparatus in accordance with claim 3 wherein said connector means further comprises slot means in said vehicle, said arm means being adapted to guide said cable into an open end of said slot means.

5. The apparatus in accordance with claim 4 wherein said slot means comprises a slot having a closed end.

6. The apparatus in accordance with claim 5 further comprising means in said slot for allowing passage of said cable from said open end of said slot to said closed end of said slot and preventing passage of said cable from said closed end of said slot to said open end of said slot.

7. The apparatus in accordance with claim 5 wherein one of said vehicle and said pod is provided with a recess and the other of said vehicle and said pod is provided with a complementarily configured portion adapted to be received by said recess.

8. The apparatus in accordance with claim 7 wherein said slot extends through said one of said recess and said complementarily configured portion on said vehicle.

9. The apparatus in accordance with claim 8 wherein said recess is conically shaped and said complementarily configured portion is conically shaped, said closed end of said slot being spaced a first distance from a central point of said one of said recess and said configured portion on said vehicle, and a point at which said cable is attached to said pod being spaced a second distance from a central point of said other of said recess and said configured portion on said pod.

10. The apparatus in accordance with claim 9 wherein said first distance equals said second distance.

11. The apparatus in accordance with claim 5 wherein said vehicle is provided with a recess and said pod is at least in part configured complementarily to said recess and adapted to be received by said recess.

12. The apparatus in accordance with claim 11 wherein said slot extends through said recess.

13. The apparatus in accordance with claim 12 wherein said closed end of said slot is spaced a first distance from a central point of said recess, and said cable is attached to said pod at a point spaced a second distance from a central point of said pod complementarily configured portion.

14. The apparatus in accordance with claim 13 wherein said first distance equals said second distance.

15. The apparatus in accordance with claim 1 further comprising means for locking said pod in engagement with said vehicle.

16. The apparatus in accordance with claim 15 wherein said locking means comprise groove means in said alignment means on one of said pod and vehicle and spring-loaded detent means on the other of said alignment means in the other of said pod and vehicle, said detent means being adapted to snap into said groove means upon engagement of said pod and said vehicle.

17. The apparatus in accordance with claim 4 wherein said vehicle arm means comprises an arm extending from either side of said vehicle, and said slot means comprise slots, each having an open end proximate to a base of one of said arms.

18. The apparatus in accordance with claim 11 including rudder means mounted on said pod for guiding said pod toward said vehicle such that said configured part of said pod approaches said recess in said vehicle in a position generally acceptable to said recess.

* * * * *